United States Patent [19]

Bradley et al.

[11] Patent Number: 5,952,421
[45] Date of Patent: Sep. 14, 1999

[54] SYNTHESIS OF PRECERAMIC POLYMER-STABILIZED METAL COLLOIDS AND THEIR CONVERSION TO MICROPOROUS CERAMICS

[75] Inventors: John Stewart Bradley, Mülheim an der Ruhr, Germany; Ernestine Williams Hill, Piscataway, N.J.; John P. Dismukes, Annandale, N.J.; Paul James Tindall, Flemington, N.J.

[73] Assignee: Exxon Research and Engineering Co., Florham Park, N.J.

[21] Appl. No.: 08/579,444

[22] Filed: Dec. 27, 1995

[51] Int. Cl.⁶ .................................................... C08G 77/06
[52] U.S. Cl. ............................................. 524/588; 528/14
[58] Field of Search ................................ 524/588; 528/14

[56] References Cited

U.S. PATENT DOCUMENTS

| | | | |
|---|---|---|---|
| 4,482,689 | 11/1984 | Haluska | 528/25 |
| 4,666,872 | 5/1987 | Baney et al. | 501/88 |
| 4,833,107 | 5/1989 | Kaya et al. | 501/97 |
| 4,835,207 | 5/1989 | Semen et al. | 524/443 |
| 4,857,492 | 8/1989 | Bradley et al. | 502/17 |
| 4,891,340 | 1/1990 | Semen et al. | 501/88 |
| 4,937,304 | 6/1990 | Ayama et al. | 528/34 |
| 4,942,145 | 7/1990 | Moehle et al. | 501/90 |
| 4,950,381 | 8/1990 | Takeuchi et al. | 528/10 |
| 5,006,492 | 4/1991 | Semen et al. | 501/97 |
| 5,571,848 | 11/1996 | Mortensen et al. | 521/61 |
| 5,747,623 | 5/1998 | Matsuo et al. | 528/15 |

FOREIGN PATENT DOCUMENTS

| | | |
|---|---|---|
| 175384 | 3/1986 | European Pat. Off. . |
| 0 200 326 A1 | 12/1986 | European Pat. Off. . |
| 0 331 424 A1 | 9/1989 | European Pat. Off. . |
| 0 376 183 A1 | 7/1990 | European Pat. Off. . |
| 0 389 084 | 9/1990 | European Pat. Off. . |
| 7-196986 | 8/1995 | Japan . |

OTHER PUBLICATIONS

Ceramics From Organometallic Polymers, Peuckert et al, 1990, 398–404.

Pyrolysis Chemistry of Poly(organosilazanes) to Silicon Ceramics, Han et al, Feb. 24, 1992, 705–711.

A method of the determination of the pore size distribution of molecular sieve materials and its application to the characterization of partially pyrolyzed polysilastyrene/porous glass composite membranes, Grosgogeat et al, Nov. 5, 1990, 237–255.

*Primary Examiner*—Randy Gulakowski
*Attorney, Agent, or Firm*—Paul E. Purwin

[57] ABSTRACT

The present invention provides for microporous ceramic materials having a surface area in excess of 70 $m^2/gm$ and an open microporous cell structure wherein the micropores have a mean width of less than 20 Angstroms and wherein said microporous structure comprises a volume of greater than about 0.03 $cm^3/gm$ of the ceramic. The invention also provides for a preceramic composite intermediate composition comprising a mixture of a ceramic precursor and nanoscale size metallic particles, whose pyrolysis product in inert atmosphere or in an ammonia atmosphere at temperatures of up to less than about 1100° C. gives rise to the microporous ceramics of the invention. Also provided is a process for the preparation of the microporous ceramics of the invention involving pyrolysis of the composite intermediate under controlled conditions of heating up to temperatures of less than about 1100° C. to form a microporous ceramic product.

17 Claims, No Drawings

SYNTHESIS OF PRECERAMIC POLYMER-STABILIZED METAL COLLOIDS AND THEIR CONVERSION TO MICROPOROUS CERAMICS

BACKGROUND OF THE INVENTION

1. Field of the Invention

The present invention relates to open pore, microporous ceramic materials and their method of manufacture.

2. Description of Related Art

Porous materials play a particularly important role in a number of chemical processing industries and applications. Separations based on membranes are critical in such fields as chemical recovery, purification and dehumidification. Porous oxides (e.g. clays, silica, alumina and zeolite) are the materials of choice as catalysts or catalyst supports in chemical and petroleum processing reactions such as hydrocracking, hydrodesulfurization, reforming, and polymerization.

With respect to membrane technology, inorganic membranes offer a number of advantages over polymeric membranes which are typically limited to uses at temperatures below about 250° C. These include: i) higher operating temperatures, ii) greater structural integrity and hence the ability to withstand higher pressure differentials and back-flushing and iii) improved resistance to corrosion. Porous oxide, (e.g. aluminum oxide) and carbon membranes offer some of these characteristics, but advanced materials are still required for improved strength, toughness, structural integrity, temperature stability, water and oxygen resistance, thermal shock resistance, molecular selectivity to small molecules and gases, and high flux.

Similar considerations apply to clay and metal oxide type catalysts or catalyst supports, particularly as relates to stability and thermal shock resistance at temperatures above about 500° C.

Ceramic materials of the Si—C, Si—N, Si—C—N, Si—B—C, Si—B—N, Al—N, Si—Al—N, B—Al—N and related types appear to offer many of the properties set forth above. However, the sol-gel synthesis methods typically used to prepare porous oxide membranes or catalyst supports are incompatible with the preparation of ceramics of the type described above because of the need to use water in their preparation. Sintering or reactive sintering of these ceramics likewise produces materials with pore sizes of from about 0.1 to about 1000 microns which are non-uniform and generally too large for effective molecular separation and other uses as described above. Chemical vapor deposition can produce microporous ceramic layers, but this tends to be an expensive, high temperature process with limited ability to tailor complex ceramic compositions.

Recently, researchers have discovered improved methods for preparing ceramics using ceramic precursors as starting materials. A ceramic precursor is a material, either a chemical compound, oligomer or polymer, which upon pyrolysis in an inert or reactive atmosphere and at high temperatures e.g. above about 300° C., will undergo cleavage of chemical bonds liberating such species as hydrogen, organic compounds and the like, depending upon the maximum pyrolysis temperature. The resulting decomposition product is typically an amorphous ceramic containing Si—C bonds (silicon carbide), Si—N bonds (silicon nitride) or other bond structures which will vary as a function of the identity of the ceramic precursor, e.g. Si—C—N, Si—N—B, B—N, Al—N and other bond structures, as well as combinations of these structures. Mixtures of ceramic precursors, including oxygen-containing precursors, may also be used to prepare amorphous ceramics with a combination of structures. Crystallization of these amorphous ceramic products usually requires even higher temperatures in the range of 1200–1600° C.

The pyrolysis of various ceramic precursors, e.g. polycarbosilanes, polysilanes, polycarbosiloxanes, polysilazanes, and like materials at temperatures of 1300° C. and higher to produce ceramic products, e.g. silicon carbide and/or silicon nitride, is disclosed, for example, in M. Peuckert et al., "Ceramics from Organometallic Polymers", Adv. Mater.2, 398–404 (1990).

During pyrolysis, preceramic precursors such as described above liberate various gaseous decomposition species such as hydrogen and organic compounds including methane, higher molecular weight hydrocarbon molecules and lower molecular weight precursor fragments. These gases tend to coalesce within the preceramic matrix as they form, resulting in a bulking or swelling of the mass. These entrained gases can also lead to the formation of smaller gas bubbles within the developing ceramic mass as the preceramic precursor crosslinks and hardens, resulting in a reduced density ceramic having a mesoporous or macroporous closed-cell structure, without development of a significant amount of open celled micropores.

Where dense, non-porous ceramic materials are sought using ceramic precursors yielding high gas volumes, it is often necessary to conduct the pyrolysis over a very long period of time with very gradual incremental temperature increases and/or under vacuum to assist in removal of these gaseous species at temperatures where they are formed.

SUMMARY OF THE INVENTION

The present invention provides for amorphous, microporous, ceramic materials having a surface area in excess of 70 m$^2$/gm, preferably in excess of 100 m$^2$/gm, and an open-pore microporous cell structure wherein the micropores have a mean width (diameter) of less than 20 Angstroms and wherein said microporous structure comprises a volume of greater than about 0.03 cm$^3$/gm, preferably greater than 0.05 cm$^3$/gm, of the ceramic. The invention also provides for a preceramic composite intermediate composition comprising a mixture of a ceramic precursor polymer or oligomer, and nanoscale metal particles dispersed therein, whose pyrolysis product in inert atmosphere or in an ammonia atmosphere at temperatures of up to less than about 1100° C. gives rise to the microporous ceramics of the invention. Also provided is a process for the preparation of the microporous ceramics of the invention comprising: a) forming a composite intermediate composition comprising an intimate mixture of ceramic precursor polymer or oligomer having a number average molecular weight in the range of from about 200 to about 100,000 g/mole and at least about 0.01% by weight of nanoscale metal particles uniformly dispersed therein, b) gradually heating said mixture in the presence of an inert gas or ammonia gas, and in optional sequential stages with hold times at intermediate temperatures, to a maximum temperature in the range of from about 300° C. up to less than about 1100° C. and over a period of total heating and hold time of from about 5 to about 50 hours to form a microporous ceramic product, and c) cooling said microporous ceramic product.

The microporous ceramics prepared in accordance with this invention generally exhibit a surface area within the range of from about 70 to about 500 m$^2$/gm based on the combined weight of amorphous phase and metal particles, and amorphous phase micropore volumes of greater than 0.03 up to about 0.26 cm$^3$/g, wherein the volume fraction of micropores in the ceramic product ranges from about 8% to about 36%.

Ceramics produced in accordance with this invention are particularly useful in bulk sorbent applications, as active layers in membrane structures used for separations and as catalyst supports.

DETAILED DESCRIPTION OF THE INVENTION

As used herein, the term microporous ceramic refers to a ceramic having a porous structure wherein the pores have a mean width (diameter) of less than 20 Angstroms. This definition and the physical and chemical adsorption behavior of microporous materials is disclosed by S. J. Gregg and K. S. W. Sing, "Adsorption, Surface Area and Porosity", Academic Press, New York, 1982; and S. Lowell and J. F. Shields, "Powder Surface Area and Porosity", Chapman and Hall, New York, 3rd Edition, 1984. This term is to be contrasted with the term "mesoporous" which refers to pores having a mean width of greater than 20 Angstroms up to about 500 Angstroms, and with the term "macroporous", which refers to pores having a mean width of greater than 500 Angstroms. More specifically, the term microporous refers to such structures wherein essentially all of the pores have a mean width of from about 2 to about 20 Angstroms. The surface area and micropore volume are calculated from the nitrogen adsorption isotherm, which is measured at 77° K. using an automated continuous flow apparatus. The total surface area is calculated using the BET method, and the micropore volume and mesopore/macropore surface area are calculated using the T-plot method, as described in the Gregg reference above. Subtraction of the mesopore/macropore surface area from the total surface area gives an estimate of the micropore surface area.

Ceramic precursor materials which are preferred for the purposes of this invention include oligomers and polymers such as polysilazanes, polycarbosilazanes, perhydro polysilazanes, polycarbosilanes, vinylic polysilanes, amine boranes, polyphenylborazanes, polysiloxazanes, carboranesiloxanes, polysilastyrene, polytitanocarbosilanes, alumanes, (polyalazanes) and like materials, as well as mixtures thereof, and mixtures of one or more of these polymers with aluminoxanes. The pyrolysis products yield ceramic compositions containing structural units having bond linkages selected from Si—C, Si—N, Si—C—N, Si—B, Si—B—N, Si—B—C, Si—C—N—B, Si—Al—N—C, Si—Al—N, Al—N, B—N, Al—N—B and B—N—C, as well as oxycarbide and oxynitride bond linkages such as Si—O—N, Si—Al—O—N and Ti—O—C. The preferred precursors are those oligomers and polymers having a number average molecular weight in the range of from about 200 to about 100,000 g/mole, more preferably from about 400 to about 20,000 g/mole. The chemistry of these oligomeric and polymeric precursors are further disclosed in the monograph "Inorganic Polymers", J. E. Mark, H. R. Allcock, and R. West, Prentice Hall, 1992.

Particularly preferred polysilazanes are those materials disclosed in U.S. Pat. Nos. 4,937,304 and 4,950,381, the complete disclosures of which are incorporated herein by reference. These materials contain, for example, recurring —Si(H) (CH$_3$)—NH— and —Si(CH$_3$)$_2$—NH— units and are prepared by reacting one or a mixture of monomers having the formula R$_1$SiHX$_2$ and R$_2$R$_3$SiX$_2$ in anhydrous solvent with ammonia. In the above formulas, R$_1$, R$_2$ and R$_3$ may be the same or different groups selected from hydrocarbyl, alkyl silyl or alkylamino and X$_2$ is halogen. The preferred polysilazanes are prepared using methyldichlorosilane or a mixture of methyldichorosilane and dimethyldichlorosilane as monomer reactants with ammonia. The primary high temperature pyrolysis product (>1300° C.) of this precursor are silicon nitride (Si$_3$N$_4$) and silicon carbide (SiC). These precursors are commercially available from Chisso Corporation, Japan under the trade designations NCP-100 and NCP-200, and have a number average molecular weight of about 6300 and 1300 respectively.

Another class of polysilazane precursors are polyorgano (hydro) silazanes having units of the structure [(RSiHNH)$_x$(R$_1$SiH)$_{1.5}$N]$_{1-x}$ where R$_1$ is the same or different hydrocarbyl, alkylsilyl, alkylamino or alkoxy and 0.4<X<1. These materials are disclosed in U.S. Pat. No. 4,659,850, the complete disclosure of which is incorporated herein by reference.

Another preferred ceramic precursor is a polysilastyrene having the structure [(phenyl)(methyl) Si—Si (methyl)$_2$]$_n$ available under the trade designation "Polysilastyrene-120" from Nippon Soda, Japan. This material has a number average molecular weight of about 2000 and the primary pyrolysis products of this precursor in an inert atmosphere are silicon carbide and carbon.

Other preferred ceramic precursors are polycarbosilanes having units of the structure (Si(CH$_3$)$_2$CH$_2$)$_n$ and/or (Si (CH$_3$H)CH$_2$)$_n$ having a number average molecular weight in the range of about 1000 to 7000. Suitable polycarbosilanes are available from Dow Corning under the trade designation PC-X-6348 (Mn=1420 g/mol) and from Nippon Carbon of Japan under the trade designation PC-X9-6348 (Mn=1420 g/mol). The main pyrolysis products (>1300° C.) of these materials in an inert atmosphere are silicon carbide and excess carbon.

Vinylic polysilanes useful in this invention are available from Union Carbide Corporation under the trade designation Y-12044. These yield silicon carbide together with excess carbon as the main pyrolysis products in an inert atmosphere at elevated temperatures (>1300° C.).

Suitable polyalazane (alumane) preceramic precursors are those having recurring units of the structure R—Al—N—R', where R and R', are the same or different hydrocarbyl groups (particularly C$_1$-C$_4$ alkyl), and are described in an article "Polymer Precursors For Aluminum Nitride Ceramics", J. A. Jensen, pp. 845–850, in "Better Ceramics Through Chemistry", MRS Symposium Proceedings, Vol. 271 and in U.S. Pat. No. 5,276,105. The main pyrolysis product of these materials at temperatures in excess of 400° C. is aluminum nitride. Other suitable preceramic precursors will be evident to those skilled in the art, particularly those yielding SiC, $Si_3N_4$, Si—C—N, B—N, Si—B—N, $B_4C$—BN—C, Si—B—C, Si—Al—N, B—Al—N and AlN pyrolysis products.

The composite ceramic intermediate comprising a mixture of the preceramic polymer and nanoscale metal particles may be prepared by forming a stable colloidal dispersion of metal particles in an organic solvent solution of the ceramic precursor polymer or oligomer, which serves to stabilize the particles, followed by evaporation of the solvent. By the term "nanoscale metal particles" is meant particles or clusters of metal particles having a mean particle size in the range of from about 10 to about 500 Angstroms, more preferably from about 10 to about 200 Angstroms, and most preferably from about 10 to about 100 Angstroms.

The colloidal dispersion may be prepared by various techniques, including the condensation of metal vapors obtained by thermal evaporation or sputtering into organic solvents containing the dissolved preceramic polymer, the reduction of metal complexes to the metal in such a solution or the thermal decomposition of metal complexes in such a solution. As the metallic particles generate in-situ, the preceramic polymer or oligomer serves to stabilize the particles and hold them in suspension, thereby forming a colloidal dispersion. This stabilization effect is the result of either an encapsulation of the metal colloids by the dissolved preceramic material or the development of chemical bonding of the particles with the preceramic material, or may be a combination of both phenomena.

Various techniques for forming stabilized colloidal dispersions of metal particles in solutions of various polymers are disclosed in U.S. Pat. Nos. 4,252,678 and 4,857,492, the complete disclosures of which are incorporated herein by reference. It is believed that any chemical or physical method of generating elemental, nanoscale metals in a highly dispersed form in the presence of a solution of the preceramic material in organic solvent will result in the formation of stabilized colloids which, upon removal of the solvent, gives rise to the composite intermediate of this invention.

Metals which may be used as a component of the composite intermediate include any metal or mixture of metal species which can be transformed into the colloidal state in solution using the vapor deposition technique or whose complexes or salts can be reduced or decomposed in solution to yield colloid metal particles. These metals include noble metals, transition metals and rare earth metals. Preferred species are transition metals such as platinum, palladium, titanium, copper, nickel, cobalt, chromium, ruthenium, rhodium, osmium, iridium and rhenium as well as other metals such as iron, manganese, zinc, magnesium, molybdenum, tungsten and others, as well as mixtures thereof. Suitable metal complexes which may be decomposed or reduced in solution are those which are soluble in the particular solvent which also serves as a solvent for the preceramic material, and include the metal carbonyls and metal salts of organic or inorganic acids, coordination complexes with organic ligands such as beta-diketone complexes, or organometallic complexes.

Suitable solvents for use as the medium in the formation of the colloidal metal dispersion include aromatic, aliphatic, and cycloaliphatic hydrocarbons, such as benzene, toluene, hexane and methylcyclohexane; chlorinated solvents such as dichloromethane, chlorobenzene and dichlorobenzene; ethers such as tetrahydrofuran, diethyl ether and dimethyl ether; and ketones such as cyclohexanone and mesityl oxide. The particular solvent employed must dissolve the preceramic polymer or oligomer and, in the case where the metal colloid is formed in-situ by reduction or decomposition of a metal complex, must also dissolve the metal complex.

The composite intermediate is formed by first forming a solution of the preceramic polymer or oligomer in solvent. Generally, the concentration of precursor in solvent may range from about 1.0 to about 50% by weight, more preferably from about 5 to about 25% by weight. Next, a suitable amount of metal is introduced into the solution either by condensation of metal vapor into a cold, e.g., −120° C., solution of the preceramic polymer or by co-condensing the metal vapor with an aerosol of a solution of the preceramic polymer on a cooled (−196° C.) surface, or by dissolving a metal complex in the solution and subjecting the solution to conditions where the metal complex will reduce or decompose to the metal. The solution is then preferably filtered to remove any particles having sizes greater than nanoscale. The amount of metal or metal complex introduced into the solution should be such that the final composite intermediate, after removal of the solvent, will contain at least about 0.01% by weight, preferably from about 0.01 to about 35% by weight, more preferably from about 0.5 to about 25% by weight, and most preferably from about 1 to 15% by weight of said nanoscale metal particles. The solvent may be removed by any suitable process such as evaporation or mild distillation, or the solution may be allowed to form a gel prior to evaporation of the solvent. The solution or gel may also be used directly such as in the preparation of spun fibers or coatings, followed by evaporation of the solvent.

Although the factors underlying the development of the microporous, open-celled ceramic structure achieved in accordance with this invention are not completely understood, it is believed that the individual nanoscale metal particles dispersed within the composite intermediate matrix serve to prevent nucleation of large bubbles of decomposition gases which form within the matrix as the temperature increases. The decomposition gases thus more readily escape from the matrix by diffusion or convection, thereby avoiding the development of a voluminous swelling of the ceramic mass. The elimination of molecular species from the ceramic precursor molecules, accompanied by cross-linking, provides a templating effect which thus entrains a significant volume of microporosity and contributes to enhanced surface area of the resulting, solidified ceramic mass.

In addition, it has been observed that certain colloidal metals, i.e., noble metals, tend to promote or catalyze decomposition of the preceramic material such that gaseous decomposition of the preceramic commences at temperatures much lower than are required where the metal is not present. For example, thermogravimetric analysis of polysilazane/noble metal composite intermediates demonstrates an onset of weight loss at heating temperatures just below 100° C. and the development of significant microporosity at temperatures of 300–400° C., whereas a metal-free polysilazane does not exhibit significant weight loss below about 250° C. heating temperature. It is postulated that promotion of lower temperature decomposition allows the decomposition gases to escape the preceramic matrix at temperatures at which the partially pyrolyzed polymer has rheological properties which are more conducive to the development of micropore formation within the ceramic.

As indicated above, microporous ceramics having a post-pyrolysis surface area in excess of 70 $m^2$/gm and a volume of open-pore micropores greater than 0.03 $cm^3$/gm can be achieved in accordance with this invention. The surface area and micropore volume will vary depending on the identity of the ceramic precursor material, the identity of and quantity of colloidal metal present in the ceramic precursor and the maximum pyrolysis temperature. Microporous ceramics having a post-pyrolysis surface area of from 150 to 500 $m^2$/g and a micropore volume of from about 0.05 $cm^3$/gm, preferably of from about 0.08 $cm^3$/gm and up to about 0.26 $cm^3$/gm, may be readily achieved.

The microporous ceramic compositions of this invention are prepared by pyrolysis of the composite intermediate under an inert atmosphere or ammonia at a gradual heating rate, including optional sequential stages with hold times at intermediate temperatures to a final temperature in the range of from about 300° C. to less than about 1100° C.

Prior to pyrolysis, the composite intermediate may be formed into any desired shape such as a pellet, disc, fiber, thin membrane or other three dimensional shape. The dry composite may be ground and shaped using an extruder or a hydraulic press, with or without heat being applied, or by conducting the pyrolysis in a suitable mold cavity containing the composite intermediate. Fibers may be prepared by extruding or spinning a melt or the original colloidal dispersion of the composite intermediate, while thin separation membranes may be formed by applying a melt or the original colloidal dispersion of the composite intermediate to the surface of a suitable substrate, such as another ceramic, and subjecting the structure to well known spin or whirl coating techniques to form a uniform, thin coating of the composite intermediate on the surface of the substrate, followed by heating to evaporate off the solvent where solvent is present.

As indicated above, pyrolysis of the composite intermediate is next conducted by heating it under inert flowing gas, e.g. argon, helium or nitrogen, or under flowing ammonia gas, at a controlled rate of temperature, with preferred hold times at intermediate temperatures to maintain uniformity of the ceramic product, and a final hold time at the maximum heating temperature, followed by gradual cooling of the ceramic end product to room temperature. Generally speaking, microporous ceramics are formed by gradually heating the composite intermediate to a maximum temperature ($T_{max}$) in the range of from about 300° C. to less than about 1100° C. at a heating rate in the range of from about 0.5° C. to about 10° C. per minute, more preferably from about 1° C. to 7° C. per minute with various holding times of about 0.5 to about 5 hours at selected temperatures between about 200° C. and $T_{max}$. Total combined heating/holding times may range from about 3 to about 50 hours, more preferably from about 5 to about 24 hours. Holding times and temperatures are dictated by ceramic precursor decomposition and reaction kinetics. Hence, they depend on precursor composition and the rate of evolution of specific molecular species at or about the holding temperature, e.g., $H_2$, $CH_4$, higher molecular weight hydrocarbon or H—C—N species, or ceramic precursor fragments as reflected by sample weight losses at or about these temperatures. The flow rate of the inert gas or ammonia gas may range from about 100 to about 1000 cc/min.

As indicated above, the pyrolysis may be carried out by continuous heating of the composite intermediate up to ($T_{max}$) or by sequential heating including hold times at intermediate temperatures below ($T_{max}$). As a general rule where the heating rate is relatively slow, e.g., less than about 5° C./min. or 300° C. per hour, intermediate holding times below ($T_{max}$) may not always be necessary in order to form the desired microporous structure. Where the heating rate is more intense, e.g., 5° C./min. or 300° C. per hour or higher, then holding times at one or more intermediate temperatures below ($T_{max}$) may be necessary or preferred to achieve the desired microporous structure.

In the more preferred embodiment of the invention, pyrolysis is carried out in a heat treating furnace or muffle oven using the following schedule and using flowing inert gas or ammonia throughout:

i) after flushing the furnace with either an inert gas, e.g. helium or argon, or reactive gas such as ammonia, the temperature is first increased to about 175±50° C. over a period of 0.5–3 hours, held at that temperature for a period of 0.5–5 hours, preferably 1–2 hours and the temperature then increased;

ii) in the second step, the temperature is increased to $T_{max}$ or about 400±25° C., whichever is less, over a time of from about 0.5 to 5 hours, preferably from 1–2 hours and held at that temperature for 0.5–5 hours, preferably 1–2 hours, and the temperature again increased;

iii) in the third step, where $T_{max}$ is above 400° C., the temperature is increased to $T_{max}$ or about 500±25° C., whichever is less, over a time period up to about 5 hours, preferably up to 2 hours, and held at that temperature for 0.5–5 hours, preferably 1–2 hours;

iv) in a fourth step where $T_{max}$ is above 500° C., the temperature is increased to $T_{max}$ or about 650±25° C., whichever is less, over a time period up to about 5 hours, preferably up to 2 hours, and held at that temperature for 0.5–5 hours, preferably 1–2 hours;

v) in a subsequent step where $T_{max}$ ranges between 650° C. and 1100° C., the temperature is increased to $T_{max}$ over a time period of up to 5 hours, preferably 1–3 hours, and held at $T_{max}$ for 0.5–5, preferably 1–2 hours.

In the most preferred embodiment of the invention, the composite intermediate is heated as above with a 1–2 hour hold at about 200° C., 300° C., 500° C. and 650° C. (and $T_{max}$ if $T_{max}$ is greater than 650° C.), and the pyrolyzed ceramic then allowed to return from $T_{max}$ to room temperature while continuing the flow of inert gas or ammonia during the cooling period.

In addition to the factors described above, another factor which influences both surface area and the degree of microporosity which can be achieved in the microporous ceramic is the final temperature to which the ceramic is heated. It has been found with respect to most of the composite intermediates of this invention pyrolyzed under inert or ammonia gas that the surface area and degree of microporosity tends to diminish as $T_{max}$ approaches 1100° C., and tends to be at maximum levels at $T_{max}$ of up to about 500° C.±200° C. For these reasons, a more preferred heating schedule is such that $T_{max}$ ranges from about 300° C. to about 850° C., more preferably from about 400° C. to about 750° C.

The following examples are illustrative of the preparation of metal colloid/polymer composite intermediates and their thermal decomposition to microporous ceramics. As used in the examples and tables, the following designations have the following meanings:

NCP-100—A polysilazane polymer available from the Chisso Corporation of Japan having a number average molecular weight of about 6300 g/mole and a melting point of about 200° C.

NCP-200—A polysilazane polymer available from the Chisso Corporation of Japan having a number average molecular weight of about 1300 g/mole and a melting point of about 100° C.

PCS—A polycarbosilane preceramic polymer available from Nippon Carbon Company of Japan (U.S. distribution Dow Chemical Company) having a number average molecular weight of about 2000 g/mole and a melting point of about 100° C.

PSS—A polysilastyrene preceramic polymer available from Nippon Soda Corporation of Japan having a number average molecular weight of about 2000 g/mole and a melting pointing of about 200° C.

Aluminoaxanes—Organoaluminum oligomers of the general formula $(RAlO)_x$ where x=2–100 and R is an alkyl group of the general formula $C_nH_{2n-}$, prepared by partial hydrolysis of trialkylaluminum compounds $R_3Al$.

EXAMPLE 1

A composite intermediate was prepared by dissolving palladium acetate (66 mg) in dry dichloromethane (30 mL) also containing 500 mg of NCP-100 polysilazane polymer under an atmosphere of nitrogen. The initial yellow color of the solution immediately darkened. After two hours the solution was dark brown/black. The solution was filtered through a 0.2 micron teflon filter. The presence of colloidal palladium was confirmed by addition of carbon monoxide to the solution followed by infrared analysis, which showed the characteristic infrared spectrum of CO on colloidal palladium. After two days the solution had become an immobile gel.

EXAMPLE 2

A solution of NCP-100 polysilazane preceramic polymer (2.95 g) in methylcyclohexane (250 mL) was degassed through three freeze-pump-thaw cycles and added to the evacuated 12 L flask of a Torrovap Industries metal vapor synthesis reactor. The flask was cooled to −120° C. and rotated at ca. 120 rpm. When the vapor pressure had equilibrated at $10^{-3}$ torr, the system was diffusion pumped to $5 \times 10_{-5}$ torr, and nickel metal (1.0 g) was evaporated into the polymer solution from a resistively heated crucible over a period of about 4 hours. As the metal vapor condensed into the liquid phase, a brown color became noticeable in the liquid. Thereafter the furnace was cooled and the flask allowed to warm to room temperature. The brown liquid containing a dark brown gel was transferred under helium to a Schlenk tube. Any bulk metal suspended in the liquid product was filtered out by passage through a 0.2 micron teflon filter, and the colloidal nickel solution was stored under helium. Evaporation of the methylcyclohexane solvent from the gel yielded a composite intermediate in the form of a dark brown solid. Elemental analysis showed a nickel content of 4.55%.

EXAMPLE 3

1.0 g of the dried composite intermediate prepared in Example 2 was placed in an alumina boat inside a 1 inch quartz furnace tube in a tube furnace and the tube was purged with argon for 10 minutes. The same was heated to 200° C. and held at this temperature for 1 hour. The cooled tube was returned to the dry box to remove some of the product for analysis. Subsequent heating was to 400°, 650° and 900° C., holding at each temperature for 1 hour and returning the quartz tube to the dry box for sample collection. Surface area analyses were as follows:

| Sample Treatment Temperature (° C.) | Total Surface Area (m²/g) | Meso/Macro (m²/g) | Micropore Vol (cm³/g) |
|---|---|---|---|
| 25 | 16.3 | — | — |
| 200 | 159.7 | >160 | — |
| 400 | 453.8 | 67.6 | .1706 |
| 650 | 328.5 | 17.6 | .1260 |
| 900 | 1.8 | — | — |

EXAMPLE 4

A sample of metal/preceramic polymer composite intermediate was prepared as in Example 2 but using 2.95 g NCP-200 polysilazane preceramic polymer and 0.972 g nickel metal. The dried composite intermediate, which contained 4.22% Ni, was heat treated as in Example 3. Surface area analysis of the resulting ceramic was as follows:

| Sample Treatment Temperature (° C.) | Total Surface Area (m²/g) | Meso/Macro (m²/g) | Micropore Vol (cm³/g) |
|---|---|---|---|
| Room Temperature | 1.951 | — | — |
| 200 | 2.516 | — | .0004 |
| 400 | 372.8 | 153.5 | .0886 |
| 650 | 390.6 | 21.8 | .1461 |

EXAMPLE 5

A metal/preceramic polymer composite intermediate was prepared as in Example 2 but using 2.95 g NCP-100 polysilazane preceramic polymer and 0.846 g nickel metal. The dried composite intermediate, which contained 11.3% Ni, was heat treated as in Example 3. Surface area analysis of the resulting ceramic was as follows:

| Sample Treatment Temperature (° C.) | Total Surface Area (m²/gm) | Meso/Macro (m²/g) | Micropore Vol (cm³/gm) |
|---|---|---|---|
| Room Temp | 43.37 | — | — |
| 200 | 287.0 | 186.7 | 0.0378 |
| 400 | 416.8 | 48.8 | 0.1580 |
| 525 | 367.9 | 26.6 | 0.1410 |
| 650 | 314.1 | 17.2 | 0.1190 |
| 900 | 19.10 | — | — |

EXAMPLE 6

A metal/preceramic polymer composite intermediate was prepared as in Example 2, but using 2.95 g NCP-100 polysilazane preceramic polymer and 1.127 g iron metal. The dried composite intermediate was heat treated as follows: the sample was heated to 200° C., held at that temperature for one hour, then heated to 400° C., held at that temperature for one hour, then heated to 650° C., held at that temperature for one hour, then allowed to cool to room temperature. Surface area analysis was as follows:

| Sample Treatment Temperature (° C.) | Surface Area (m²/gm) | Meso/Macro (m²/g) | Micropore Vol (cm³/gm) |
|---|---|---|---|
| 650 | 418.6 | 19.4 | 0.1621 |

EXAMPLE 7

Example 6 was repeated using 1.53 g iron metal and 2.95 g preceramic polymer NCP-200. Surface area analysis on the resulting ceramic was as follows:

| Sample Treatment Temperature (° C.) | Total Surface Area (m²/g) | Meso/Macro (m²/g) | Micropore Vol (cm³/g) |
|---|---|---|---|
| 650 | 387.0 | 15.5 | .1481 |

EXAMPLE 8

Example 3 was repeated using a metal/preceramic polymer composite intermediate prepared in the following manner. A palladium/poly(isobutylaluminoxane) colloid was prepared in methylcyclohexane as in Example 2, and to it was added a solution of NCP-100 preceramic polymer in methylcyclohexane, to give a solution containing 0.2 g palladium, 0.60 g NCP-100 and 1.0 poly (isobutylaluminoaxane), a 1:1 ratio of NCP-100 and poly (isobutylaluminoxane). The dried solution was ground in a mortar and pestle and placed in an aluminum oxide boat. The sample was heated in flowing argon to 400° C., held at that temperature for one hour, then allowed to cool to room temperature. Surface analysis on the resulting ceramic was as follows:

| Sample Treatment Temperature (° C.) | Total Surface Area (m²/g) | Meso/Macro (m²/g) | Micropore Vol (cm³/g) |
|---|---|---|---|
| 400 | 562.6 | 78.3 | not measured |

EXAMPLE 9

A composite intermediate containing 1.04 g palladium and 5.0 g poly(isobutylaluminoxane) was prepared as in Example 2. It was heated as in Example 3, but to a final temperature of 700° C. Surface area analysis of the resulting ceramic was as follows:

| Sample Treatment Temperature (° C.) | Total Surface Area (m²/g) | Meso/Macro (m²/g) | Micropore Vol (cm³/g) |
|---|---|---|---|
| 700 | 407.2 | 29.9 | 0.1485 |

EXAMPLE 10

Example 2 was repeated, but using preceramic polymer NCP-100 (2.95 g) and 1.12 g evaporated iron metal. The dried iron/polymer material, 1.0 gram, containing 1.79% Fe, was ground in an agate mortar and pestle and placed in an aluminum oxide boat and inserted in the steel liner of a heat treating furnace, and purged with flowing ammonia for 30 minutes. The sample was then heated in flowing ammonia gas to a final temperature of 700° C. The heating schedule used was as follows: the furnace was heated under ammonia at a flow rate of 300 cc/minute to 200° C. in 60 minutes, held in 200° C. for 240 minutes, heated to 300° C. in 120 minutes, held at 300° C. for 300 minutes, then heated to 400° C. in 120 minutes, held at 400° C. for 300 minutes, then heated to 500° C. in 120 minutes, held at 500° C. for 300 minutes, then heated to 700° C. in 120 minutes and held at that temperature for 120 minutes before allowing to cool to room temperature. Surface area analysis of the resulting ceramic was as follows:

| Sample Treatment Temperature (° C.) | Total Surface Area (m²/g) | Meso/Macro (m²/g) | Micropore Vol (cm³/g) |
|---|---|---|---|
| 700 | 327.3 | 7.0 | 0.1236 |

EXAMPLE 11

Example 10 was repeated using PSS-120 polysilastyrene preceramic polymer and 0.78 g iron. The dried composite intermediate, prior to heat treatment, contained 1.07% Fe. Surface area analysis of the resulting ceramic was as follows:

| Sample Treatment Temperature (° C.) | Total Surface Area (m²/g) | Meso/Macro (m²/g) | Micropore Vol (cm³/g) |
|---|---|---|---|
| 700 | 286.2 | 14.1 | 0.1064 |

EXAMPLE 12

Example 10 was repeated using 5.90 NCP-200 preceramic polymer and 1.415 g iron metal. The dried composite intermediate, prior to heat treatment, contained 3.36% Fe. Surface area analysis of the resulting ceramic was as follows:

| Sample Treatment Temperature (° C.) | Total Surface Area (m$^2$/g) | Meso/Macro (m$^2$/g) | Micropore Vol (cm$^3$/g) |
|---|---|---|---|
| 700 | 216.9 | 19.6 | .0851 |

EXAMPLE 13

Example 10 was repeated using 5.9 g NCP-200 preceramic polymer and 0.64 g titanium metal. The dried composite intermediate, prior to heat treatment, contained 2.47% Ti. Surface area analysis of the resulting ceramic was as follows:

| Sample Treatment Temperature (° C.) | Total Surface Area (m$^2$/g) | Meso/Macro (m$^2$/g) | Micropore Vol (cm$^3$/g) |
|---|---|---|---|
| 700 | 262 | 11.2 | .0985 |

EXAMPLE 14

Example 1 was repeated using 1 gm NCP-200 and 132.7 mg of palladium acetate. Then 1 gm of the resulting composite intermediate gel was heated under Ar as in Example 3, to obtain ceramics at 400° C. and 700° C. respectively. Surface area analysis of these ceramics was as follows:

| Sample Treatment Temperature (° C.) | Total Surface Area (m$^2$/g) | Meso/Macro (m$^2$/g) | Micropore Vol (cm$^3$/g) |
|---|---|---|---|
| 400 | 326 | 66 | .1166 |
| 700 | 227 | 88 | .0531 |

EXAMPLE 15

In a vacuum chamber fitted with sputtering guns, a liquid aerosol inlet nozzle and a rotating, cryogenically cooled, stainless steel table, molybdenum metal vapor, generated by argon ion sputtering, was condensed onto a cooled (−196° C.) stainless steel plate, onto which was also condensed an aerosol of a solution of NCP 100 in methylcyclohexane in such a way as to ensure efficient intermixing of the metal and organic components. After completion of the co-condensation, the product was allowed to warm to room temperature where a gel formed, removed from the reactor and the organic liquid removed by evaporation. The resulting composite intermediate contained 2.47% Mo. After heating in an argon atmosphere as in Example 3, a porous ceramic material was obtained. Surface area analysis of the ceramic was as follows:

| Sample Treatment Temperature (° C.) | Total Surface Area (m$^2$/g) | Meso/Macro (m$^2$/g) | Micropore Vol (cm$^3$/g) |
|---|---|---|---|
| 650 | 323 | 9 | .1321 |

EXAMPLE 16

Example 15 was repeated using 2.92 gm NCP-200 instead of NCP 100. A 1 gm sample of the gel, analyzed to contain 2.63% Mo, was first flushed with argon, and then heated in NH$_3$ to 200° C. and held for one hour, then to 400° C. and held one hour, and then further heated to a final temperature of 650° C., held one hour and cooled. Surface area analysis of the resulting ceramic was as follows:

| Sample Treatment Temperature (° C.) | Total Surface Area (m$^2$/g) | Meso/Macro (m$^2$/g) | Micropore Vol (cm$^3$/g) |
|---|---|---|---|
| 650 | 356 | 15 | .1459 |

EXAMPLE 17

Example 15 was repeated using 2.92 gm NCP-200 with sputtered vanadium metal instead of molybdenum. A 1 gm sample of the gel, analyzed to contained 2.14% V, was first flushed with argon, and then heated in NH$_3$ to 200° C. and held for one hour, then to 400° C. and held one hour, and then further heated to a final temperature of 650° C., held for one hour and cooled. Surface area analysis of the resulting ceramic was as follows:

| Sample Treatment Temperature (° C.) | Total Surface Area (m$^2$/g) | Meso/Macro (m$^2$/g) | Micropore Vol (cm$^3$/g) |
|---|---|---|---|
| 650 | 353 | 110 | .1443 |

What is claimed is:

1. A preceramic composition comprising a mixture of a ceramic precursor selected from the group consisting of polysilazanes, polysiloxazanes polycarbosilizanes. perhydropolysilazanes, polycarbosilanes, vinylic polysilanes, amine boranes, polyphenylborazones, carboranesiloxanes, polysilastyrenes, polytitanocarbosilanes, alumanes (polyalazanes) and mixtures thereof, and mixtures of one or more of said precursors with aluminoxanes, and having a number average molecular weight in the range of from about 200 to about 100,000 g/mole having uniformly dispersed therein at least about 0.01% by weight of nanoscale metal particles, said particles having a mean particle size in the range of from about 10 to about 500 Angstroms.

2. The composition of claim 1 wherein said ceramic precursor is selected from the group consisting of polysilazanes, polysiloxazanes polycarbosilazanes, perhydropolysilazanes, polycarbosilanes, vinylic polysilanes, amine boranes, polyphenylborazones, carboranesiloxanes, polysilastyrenes, polytitanocarbosilanes, alumanes (polyalazanes) and mixtures thereof, and mixtures of one or more of said precursors with aluminoxanes.

3. The composition of claim 2 wherein said ceramic precursor is a polysilazane.

4. The composition of claim 2 wherein said ceramic precursor is a polycarbosilane.

5. The composition of claim 2 wherein said ceramic precursor is a polysilastyrene.

6. The composition of claim 2 wherein said ceramic precursor is a mixture of polysilazanes and aluminoxanes.

7. The composition of claim 1 which contains up to about 35% by weight of said metal particles.

8. The composition of claim 7 which contains from about 0.5 to about 25% by weight of said metal particles.

9. The composition of claim 8 containing from about 1 to about 15% by weight of said metal particles.

10. The composition of claim 1 wherein said metal is nickel.

11. The composition of claim 1 wherein said metal is platinum or palladium.

12. The composition of claim 1 wherein said metal is iron.

13. The composition of claim 1 wherein said metal is titanium.

14. The composition of claim 1 wherein said metal is molybdenum.

15. The composition of claim 1 wherein said metal is vanadium.

16. A stabilized colloidal dispersion comprising a suspension of nanoscale metal particles, the metal is selected from the group consisting of transition metals, noble metals, and rare earth metals, said particles having a mean particle size in the range of from about 10 to about 500 Angstroms, suspended in an organic solvent solution containing dissolved therein a ceramic precursor polymer selected from the group consisting of polysilozanes, polysiloxazanes, polycarbosilazanes, perhydropolysilazanes, polycarbosilanes, vinylic polysilanes, amine boranes, polyphenylborazones, carboranesiloxanes, polysilastyrenes, polytitanocarbosilanes, alumanes (polyalazanes), and mixtures thereof, and mixtures of one or more of said precursors with aluminoxanes.

17. The dispersion of claim 16 wherein said nanoscale particles have a mean particle size in the range of from about 10 to about 200 Angstroms.

* * * * *